A. ZWIEBEL.

Improvement in Grain-Separators.

No. 128,197. Patented June 18, 1872.

Witnesses:
T. C. Smith
Edw. W. Donn

Inventor:
Anton Zwiebel
by his atty's
A. H. & R. K. Evans 128,197

UNITED STATES PATENT OFFICE.

ANTON ZWIEBEL, OF BURLINGTON, WISCONSIN.

IMPROVEMENT IN GRAIN-SEPARATORS.

Specification forming part of Letters Patent No. 128,197, dated June 18, 1872.

*To all whom it may concern:*

Be it known that I, ANTON ZWIEBEL, of Burlington, Wisconsin, have invented a new and useful Improvement in Grain-Separators, of which the following is a clear, full, and exact description, reference being had to the accompanying drawing making a part of this specification, in which—

Figure 1:
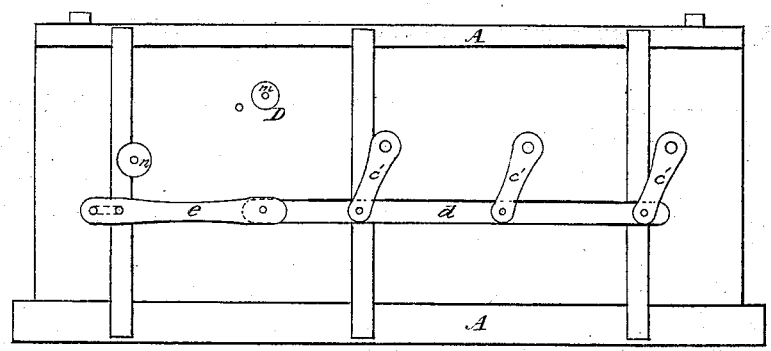
Figure 2:
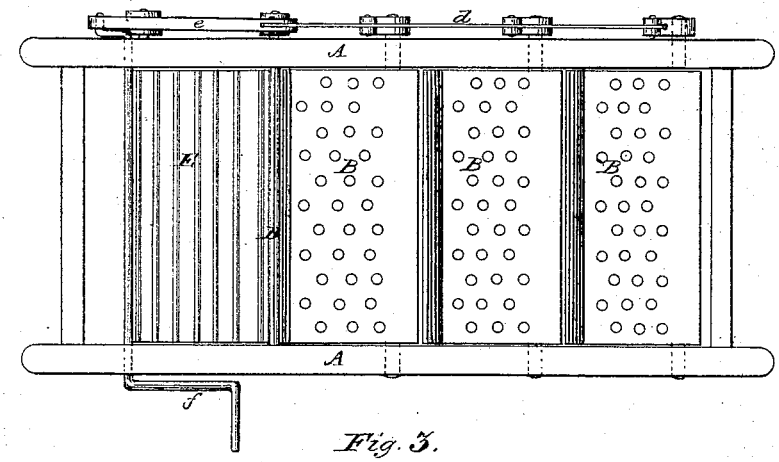
Figure 3:
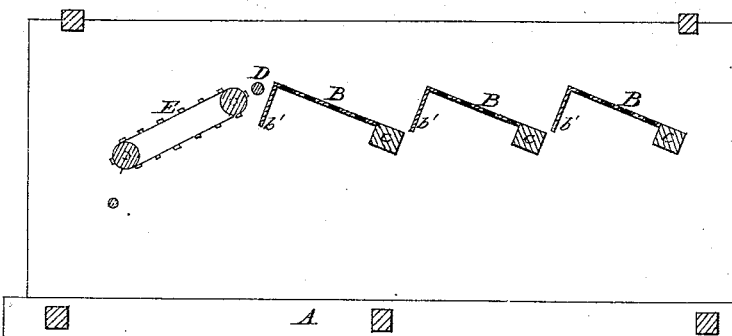

Figure 1 is a side view of my invention. Fig. 2 is a top view of the same, and Fig. 3 is a longitudinal vertical section through the line $x\ x$.

The object of my invention is to secure a proper and more perfect agitation or shaking of the straw after it has passed through the thrashing-machine in order to remove therefrom the loose grain; and it consists of a series of agitators so arranged as to rise and fall with the straw and having attached foot-boards which give the straw a backward motion in its progress from the thrashing-cylinder, thus insuring a better separation of the loose grain from the straw. It also consists in a revolving picker placed in position between the agitators and the apron, in order to loosen the thrashed grain-stocks so as to allow the grain to fall through the agitators more freely.

In order to enable others skilled in the art to make and use my invention, I will proceed to describe the manner in which I have carried it out.

A is a strong frame in which I place the agitators B, so perforated that the loose grain will readily fall through from the passing straw. These agitators are attached to shafts $c$, having suitable bearings in the sides of the frame A, and constructed with the foot-boards $b'$. At one end of the shafts $c$ is secured the arms $c'$, which are attached at their opposite ends to the bar $d$ by means of slots and rivets, so that the arms may have a free motion as bar $d$ is moved backward and forward. This motion gives to the agitators the peculiar motion desired. The bar $d$ is pivoted to arm $e$, and through this arm receives its motion from the crank-shaft $f$, having bearings in the frame A. The revolving picker D, having its bearings in the frame A, has a band-wheel, $m$, which is connected by a band with the band-wheel $n$ on the shaft which carries the apron E.

Having thus described my invention, what I claim as new, and desire to secure by Letters Patent, is—

1. In a grain-separator, the straw-agitator B, one or more, when provided with the foot-board $b'$, and all constructed and arranged to operate substantially in the manner described.

2. I also claim the apron E, in combination with the agitators B, when constructed and arranged substantially as and for the purpose set forth.

3. I also claim the picker D, in combination with the agitators B and apron E, all constructed and arranged substantially as and for the purpose set forth.

ANTON ZWIEBEL.

Witnesses:
LEWIS KAUST,
ORSON SHELDON.